United States Patent Office 3,207,734
Patented Sept. 21, 1965

3,207,734
METHOD FOR PRODUCING POLYPROPYLENE IN THE PRESENCE OF TITANIUM TRICHLORIDE, AN ALUMINUM TRIALKYL AND AN ANTIMONY TRIHALIDE
Yoshio Tsunoda, Tokyo, and Yuji Kobayashi, Itsuho Aishima, Yukichi Takashi, and Sumio Fujimoto, Nobeoka-shi, Japan, assignors to Asahi Kasei Kogyo, Kabushiki Kaisha, Kita-ku, Osaka, Japan, a corporation of Japan
No Drawing. Filed June 22, 1961, Ser. No. 118,767
Claims priority, application Japan, June 29, 1960, 35/29,395; Apr. 25, 1961, 36/14,219
9 Claims. (Cl. 260—93.7)

The present invention pertains to a novel catalyst composition, and to a method for producing polypropylene having a high crystallinity by use of the novel catalyst.

One object of the invention is to provide a novel catalyst which enables the production of polypropylene highly rich in isotactic structure. Another object is to provide a method for producing polypropylene by a polymerization of propylene using said catalyst, said polypropylene being highly rich in isotactic structure and yielding fibers, films, and other shaped articles having excellent properties, when processed as is, and without extraction or fractional dissolution of the resulting polymeric product. Still another object of the invention is to provide polypropylene which is highly rich in isotactic structure, and which yields fibers, films, and other shaped articles having excellent properties, when the polymeric product resulting from the polymerization of propylene using said novel catalyst is processed as it is, namely without extraction or fractional dissolution.

For the polymerization of proplyene, a variety of methods have heretofore been proposed. Among these, for instance, are polymerizing methods using metal oxides, such as a method using a catalyst consisting of silica-alumina and a higher order oxide of chromium (see Japanese patent publication No. SHO 32–987), and a method using a catalyst consisting of oxides of alkali-earth metal and a metal belonging to the VI–A group in the Periodic Table (see Japanese patent publication No. SHO 33–3893).

These methods, however, yield a polypropylene having a lower crystallinity and a lower molecular weight, and can not provide a high molecular material having excellent strength. Accordingly, it has been desired to remarkably increase the proportion of the isotactic polypropylene contained in the resulting polymeric product, thereby to increase the crystallinity, for broad utilization of the polypropylene as excellent high molecular material for fibers, films, and other shaped articles.

Natta et al. have found that a linear polymer of propylene could be produced by use of a catalyst obtained by reaction of a compound of metals belonging to the IV and VI–A groups of the Periodic Table (including thorium and uranium) with a metal belonging to the II and III groups of the Periodic Table, an alloy thereof, or a hydride or an organometallic compound of metals belonging to the I and III groups of the Periodic Table (see Japanese patent publication No. SHO. 32–10596). They have further found that, in polymerizing propylene by use of the afore-mentioned catalyst, a stereo-specific, highly crystalline polymer which is rich in isotactic structure could be formed by use of the solid, especially crystalline and insoluble catalyst, or the lower dispersible catalyst, for example a catalyst obtained by reaction of triethylaluminum and titanium trichloride (see Japanese patent publication No. SHO. 34–2489). The latter of the inventions proposed by Natta et al. is significant in that it provides an advanced step over the former. However, the propylene polymerization according to this method yields a polymeric product containing not more than 80% of the isotactic polymer as shown by the proportion of the n-heptane-insoluble part (see Japanese patent publication No. SHO 34–2489). This figure shows that the product contains a considerable amount of non-crystalline polymer which seems to have stereo-irregular structures (namely atactic and stereo-block polymers). Fibers produced from the polymer having such degree of proportion of the isotactic polymer have a fatty "hand" as mentioned by the inventors themselves in Japanese patent publication No. SHO 35–4722, which is a remarkable obstacle to its use. To overcome this difficulty, Natta et al. have suggested that non-crystalline, atactic polymer be removed from the polymeric product by extraction with an organic solvent, for example with 2-ethylhexane, to leave a polymer more rich in the isotactic structure, which can yield superior fibers, films, and other shaped articles (see Japanese patent publication No. SHO 35–4895).

The present inventors have perfected the invention after full investigations on the method for producing a highly stereoregular, crystalline polymer of propylene which yields fibers, films, and other shaped articles having excellent properties, when processed as it is, and without such procedures as extraction and fractional dissolution as mentioned above.

According to the present invention, a method for producing polypropylene rich in isotactic structure is contemplated, in which propylene is polymerized in the presence of a catalyst consisting of, or prepared by reaction of, a trialkylaluminum, titanium trichloride, and an antimony trihalide, preferably in a proportion of 1 to 8 mol. of the trialkylaluminum and 0.001 to 2 mol. of the antimony trihalide per mol. of titanium trichloride.

The catalyst employed in the invention is considered to provide active sites which are highly stereo-selective to the polymerization of propylene, and the polymer obtained is proved to contain about 90% or more of isotactic polypropylene, and, besides, to have various advantageous characteristics and effectiveness.

Concretely speaking, the catalyst employed in the present invention is extremely active, and gives a few times as rapid a polymerization velocity as the case where a binary catalyst system consisting of ordinary titanium trichloride ($\alpha$-type) produced by hydrogen reduction of titanium tetrachloride, and triethylaluminum. Also, the intrinsic viscosity ($\eta$sp/c) of the polymer obtained by the invention is not greatly affected by the existence of the antimony trihalide. Thus, in spite of the fact that the velocity in the polymerization by use of the catalyst of the invention is a few times as rapid as that by use of the conventional binary catalyst, for example the one composed of trialkylaluminum and titanium trichloride, the intrinsic viscosity of the polymer obtained according to the invention is 2 to 5, which is almost the same as that of the polymer obtained according to the same condition by use of the binary catalyst system.

Moreover, the polymeric product obtained according to the invention contains the isotactic polymer in a proportion reaching about 90%, and it can be formed in fibers, films, or other shaped articles having no fatty "hand," as it is, i.e. without any purification procedures, such as extraction and fractional dissolution.

The mechanism of the propylene polymerization by use of the ternary catalyst system of the invention is not yet obviously known, but it may be considered that the catalyst system used in the invention provides catalytically active sites which give the polymer a higher stereo-regularity, since the polymerization by use of the ternary catalyst system according to the invention permits the formation of a much more highly isotactic polymer with a higher polymerization velocity, as compared with the case of the polymerization by use of the binary catalyst system as disclosed in Japanese patent publication No. SHO 34–2489.

The invention will more minutely be explained below. A reaction vessel equipped with a stirrer was half filled with a dehydrated inert organic reaction medium, for example, n-hexane. Under an inert gas atmosphere, such as nitrogen, 0.06 part (by weight) of a trialkylaluminum, for example, triethylaluminum, and 0.04 part (by weight) of titanium trichloride, based upon 60 parts (by weight) of n-hexane, were added thereto. Then, 0.02 part (by weight) of an antimony trihalide, for example antimony trichloride, was further added, and the mixture was stirred. Propylene was pressed therein and kept, for example, at the pressure of 6 kg./cm.$^2$ at 70° C. for 3.5 hours under continuous stirring. After a definite period of time, the reaction vessel was cooled and the residual propylene was removed. The reaction mixture was treated with methanol to decompose the residual catalyst, and the polymer was separated by filtration, washed with methanol, and dried, to yield 35.7 parts (by weight) of a white solid polymer. The polymer thus obtained was in the form of fine granules giving a smooth feeling. The n-heptane-insoluble part was 89.5%, and the intrinsic viscosity (in tetralin solution at 135° C.) was 2.9.

The polymerization velocity in an embodiment of the invention as mentioned above is as high as 85, when calculated as weight of the polymer formed per unit weight of the whole catalyst system containing antimony trichloride per hour. The resulting polymer is fusion-spun to form filaments or staple fibers of, for example, 2.5 denier/fil. and then to form textiles, which have a sufficiently satisfactory touch, or "hand," without fatty touch or "hand," the latter having been considered to be the biggest shortcoming of the conventional polymer.

The trialkylaluminum employed in the present invention has lower alkyl radicals having not more than 6 carbon atoms, which radicals may be same or different from each other. Particularly, the compound is selected from the group consisting of triethylaluminum, tripropylaluminum, and tributylaluminum.

As to the antimony trihalide, antimony trichloride, tribromide, trifluoride, or triiodide may be employed. Particularly, the trichloride and tribromide can form the active catalysts.

Concerning the amount of the catalyst to be added, titanium trichloride is desirably employed in an amount of 0.0001 to 0.05 mol. per mol. of the monoolefin to be polymerized. Trialkylaluminum and antimony trihalide are employed in a proportion of 1 to 8 mol. and 0.001 to 2 mol., respectively, per mol. of titanium trichloride.

The amount of trialkylaluminum to be added, of less than 1 mol. per mol. of titanium trichloride, is not favored, since the polymerization is suppressed or inhibited below such amount. While, an amount more than 8 mol. is undesired, because the use of too great an amount merely decreases the degree of polymerization, and does not serve for the crystallinity and the polymerization velocity.

If the amount of antimony trihalide is increased, the polymerization is suppressed and finally inhibited. Thus, the use of more than 2 mols. of antimony trihalide, per mol. of titanium trichloride has to be avoided. While, the use of less than 0.001 mol. of antimony trichloride per mol. of titanium trichloride does not accelerate the polymerization and does not increase the crystallinity, whatever amount of the trialkylaluminum is used.

To show the effect of the added amount of the antimony trihalide to the polymerization, the results of polymerizations are set forth in Table 1 below, wherein propylene is polymerized by use of catalysts prepared from 0.00125 mol. of titanium trichloride, 0.0070 mol. of triethylaluminum, and a varying amount of antimony trichloride, with the same experimental conditions as in the following Example 1.

TABLE 1

| Exp. No. | SbCl$_3$/ TiCl$_3$ mol ratio | Polymerization velocity (g./g. TiCl$_3$/hr.) | Polymerization yield (percent) | Boiling n-heptane-insoluble part (percent) | Intrinsic viscosity (g./100 cc.)$^{-1}$ |
|---|---|---|---|---|---|
| 1 | 0 | 30 | 95 | 76.5 | 2.87 |
| 2 | 0.05 | 42 | 97 | 82.1 | 2.92 |
| 3 | 0.10 | 80 | 95 | 89.3 | 3.05 |
| 4 | 0.50 | 180 | 98 | 90.2 | 3.26 |
| 5 | 1.00 | 120 | 96 | 90.0 | 3.80 |
| 6 | 2.00 | 32 | 82 | 89.2 | 3.63 |

NOTE 1—The polymerization velocity means gram amount of the polymer produced per gram of titanium trichloride per hour.
NOTE 2—The intrinsic viscosity is the value in tetralin solution at 135° C.

As obvious from the table, it is seen that the polymerization is suppressed when more than 2 mol. of antimony trichloride per mol. of titanium chloride is used.

In carrying out the present invention efficiently, remarkable efficacy of the catalyst can be obtained by use of 0.001 to 2 mol. of antimony trihalide per mol. of titanium trihalide. But, if a comparatively higher amount within the above-identified range, of antimony trihalide is used, the removal of the residual catalyst from the polymer is much more difficult, so that as low an amount of antimony trihalide as possible within said range is desirable for obtainment of a superior product. However, the use of an extremely small amount, such as not higher than 0.05 mol., of antimony trihalide per mol. of titanium trichloride according to the polymerization method as mentioned above, does not effectively display the catalytic effects. When such novel catalytic effects as mentioned above are desired by use of an extremely small amount of antimony trihalide, it is necessary that the catalyst be preliminarily prepared by reaction of each of the catalyst components at an adequate concentration, and, then, the polymerization is effected by use of such catalyst. To prepare the catalyst, 0.03 to 100 mM./liter of an antimony trihalide, 1 to 500 mM./liter of a trialkylaluminum, for example, triethylaluminum, and 0.2 to 100 mM./liter of titanium trichloride may be mixed for from 10 min. to 5 hours in a lower aliphatic hydrocarbon medium, such as n-hexane, at a temperature of −20° to 100° C., particularly from room temperature to 100° C., for the reaction. When the catalyst thus prepared is employed as it is, or as one component of the catalyst composition, for the polymerization, it is possible to produce a polymer containing as low as 0.03% or below of the residual catalyst, while obtaining the features of the invention.

This result will be explained with reference to the comparison of polymerizations set forth in Examples 8, 9 and 11.

TABLE 2

| Ex. | SbCl$_3$/ TiCl$_3$ | Polymerization velocity (g./g. TiCl$_3$/hr.) | n-Heptane-insoluble part (percent) | $\eta$sp/c (g./100 cc.)$^{-1}$ | Ash (percent) |
|---|---|---|---|---|---|
| 11 | 0 | 30 | 75.8 | 2.72 | 0.02 |
| 8 | 0.01 | 28 | 78.6 | 2.98 | 0.04 |
| 9-(a) | 0.001 | 33 | 83.2 | 3.11 | 0.02 |
| 9-(b) | 0.01 | 37 | 85.7 | 3.30 | 0.02 |
| 9-(c) | 0.02 | 44 | 88.3 | 3.85 | 0.03 |
| 9-(d) | 0.05 | 52 | 89.2 | 4.02 | 0.03 |

Polymerization velocity: g. amount of polymer produced per gram of TiCl$_3$ per hour.
$\eta$sp/c (intrinsic viscosity): intrinsic viscosity in 0.1% Tetralin solution at 135° C.
Ash: residual catalyst percent when the polymer is ignited in the air at maximum 600° C.

As found in the table, the preliminary preparation of the catalyst prior to the polymerization is a necessary condition if a decreased amount of an antimony trihalide is to be used. This effect is obvious from the comparison of the results of Examples 8 and 9–(b). The amount of the residual catalyst in the polymer produced by the said condition according to the invention is small as compared to the amount of the residual catalyst in the polymer obtained by the use of a catalyst consisting of triethylaluminum and titanium trichloride, this fact being the most notable characteristic of the invention.

While, when the polymerization is carried out by use of as much as 0.05 mol. or more of an antimony trihalide per mol. of titanium trichloride, the preliminary catalyst preparation as mentioned above is necessary, and the sequence of addition of the catalyst components does not affect the activity of the catalyst prepared. Moreover, the catalyst components may be mixed prior to the charge of the monomer, or in the presence of the monomer, or one or more of the catalyst components may be successively added.

The present invention may be conducted either with or without a reaction medium, which should be inert to each of the catalyst components and may be an aliphatic, alicyclic, or aromatic hydrocarbon, for example, butane, n-heptane, n-hexane, isooctane, benzene, toluene, xylene cyclohexane, tetrahydronaphthalene, and the like. The amount of such medium compared to that of propylene may be broadly varied according to the mode of polymerization, but it is generally suitable to use not more than 20 parts by weight of the medium per part by weight of the monoolefin.

To produce a superior high molecular polymer according to the invention, a polymerization temperature of 15° to 120° C., particularly 40° to 80° C., is preferable. The polymerization pressure may be selected within a broad range, but a pressure between atmospheric pressure and 30 atm., more particularly between atmospheric pressure and 10 atm. can well attain the object.

The effectiveness and characteristics of the invention will more fully be understood by the following comparison, in which the polymerizations by use of a binary catalyst system containing no antimony trihalide and the polymerizations by use of the ternary catalyst systems containing a comparatively larger amount of antimony trihalide are compared, as follows. The detailed procedures will be described in the following Examples 4, 5, and 12.

examples below, which however are provided merely by way of illustration and not by way of limitation.

*Example 1*

In a 300 cc.-content stainless steel autoclave was placed 150 cc. of n-hexane. There were added 0.0050 mol. of triethylaluminum and 0.0025 mol. of titanium trichloride under a dried nitrogen stream which was substantially free from oxygen, and further added 0.0010 mol. of anhydrous antimony trichloride. The autoclave was closed, cooled to −80° C., evacuated, and fed with 20 g. of highly pure propylene which was condensed in the autoclave. After raising the temperature to 70° C., the autoclave was shaken for 2 hours. The polymerization proceeded rapidly, and the polymerization pressure decreased completely after about 1 hour.

The resulting polymeric product was treated with 500 cc. of methanol to decompose the catalyst, boiled with 30% methanolic hydrogen chloride, washed with water and dried to yield 19.8 g. of a white powdered polymer. The boiling n-heptane-insoluble part of the resulting polymer was 89.5%, and the intrinsic viscosity in Tetralin solution at 135° C. was 3.00.

*Example 2*

A process of proylene polymerization was carried out with the same experimental conditions and procedures as those of Example 1, excepting that antimony triiodide and toluene were used in place of the atnimony trichloride and the n-hexane. The polymerization pressure completely descended after 1 hour. The resulting polymer was treated with 500 cc. of methanol, and then boiled with 30% methanolic hydrogen chloride. The solid polymeric product was separated, washed with water, and dried, to yield 19.5 g. of white powdered polymer.

The boiling n-heptane-insoluble part in the resulting polymer was 90.2%, and the intrinsic viscosity in Tetralin solution at 135° C. was 3.25.

*Example 3*

In a 300 cc.-content electro-magnetically stirring autoclave was placed a benzene solution containing 0.0010 mol. of antimony tribromide dissolved therein, to which

TABLE 3

|  | Japanese Patent Pub. SHO 34-2489, Example 3 | B.P. 826,908, Example | Example 12 | Example 4 of the invention | Example 5 of the invention |
| --- | --- | --- | --- | --- | --- |
| Catalyst composition: |  |  |  |  |  |
| TiCl₃ mol | 0.006 | 0.0023 | 0.00063 | 0.00063 | 0.0063 |
| AlEt₃ mol | 0.008 | 0.0075 | 0.0025 | 0.0025 | 0.0100 |
| SbCl₃ |  |  |  | 0.00025 | 0.0030 |
| n-Heptane, cc | 250 | 50 | 250 | 250 | 250 |
| Polymerization conditions: |  |  |  |  |  |
| Temperature, °C | 70 | 85 | 70 | 70 | 70 |
| Partial pressure of propylene, atm. (gauge) | 1.3 | 6.3 | 3.0 | 3.0 | 1.0 |
| Time, hour | 4.0 | 4.5 | 4.0 | 4.0 | 2.0 |
| Polymerization velocity, g./g.TiCl₃/hr | 11.5 |  | 30 | 170 | 43 |
| Boiling n-Heptane insoluble part, percent | <80 | 70 | 78.6 | 88.9 | 91.2 |
| Intrinsic viscosity (g./100 cc.)⁻¹ |  |  | 2.98 | 3.02 | 3.12 |

NOTE 1.—The polymerization velocity is shown as gram amount of the polymer produced per gram of titanium trichloride per hour.
NOTE 2.—The intrinsic viscosity is the value in tetralin solution at 135° C.

As seen from the table, the polymerization using the novel catalyst of the invention consisting of triethylaluminum, antimony trichloride and titanium trichloride, yields about 10% higher content of the isotactic polymer and a higher polymerization velocity, when compared with that using the binary catalyst consisting of triethylaluminum and titanium trichloride with the same polymerization conditions.

The operative process of the present invention will more fully be disclosed with reference to the working were further added 0.0070 mol. of tripropylaluminum, 0.0090 mol. of triethylaluminum, and 0.0020 mol. of titanium trichloride. According to the same procedure as in Example 1, then, 20 g. of propylene was polymerized at 40° C. The polymerization proceeded rapidly, and the pressure decreased completely after about 3 hours. The resulting white solid polymer weighed 19.5 g.

The boiling n-heptane-insoluble part of the resulting polymer amounted to 88.0%, and the intrinsic viscosity in Tetralin solution at 135° C. was 3.25.

Example 4

In a 500 cc.-content stainless steel autoclave equipped with an electro-magnetic stirrer was placed 250 cc. of n-heptane, to which were added 0.0025 mol. of triethylaluminum and 0.00063 mol. of titanium trichloride under a dried nitrogen stream which was substantially free from oxygen. There was further added 0.00025 mol. of anhydrous antimony trichloride. The autoclave was closed and evacuated in an oil bath kept at 70° C., and highly pure propylene monomer was pressed therein under electro-magnetic stirring so as to keep the partial pressure of propylene constantly at 3.0 atm. (gauge). The autoclave was opened after 4 hours, and the resulting polymer was washed with methanol, then with water, and dried to yield 70 g. of white powdered polymer.

The polymerization velocity and the proportion of the boiling n-heptane-insoluble part in the resulting polymer, as well as the solution viscosity, were shown in Table 3. It was recognized that a polymer having a higher degree of crystallinity was obtained with an exceedingly higher polymerization velocity.

Example 5

Using the same apparatus and by the same procedure as in Example 4, but keeping the partial pressure of propylene at 1.0 atm. (gauge), the polymerization was conducted under the reaction conditions as set forth in Table 3. After 2 hours reaction, 30 g. of a white powdered polymer was yielded. The polymerization velocity and the boiling n-heptane-insoluble part of the polymer, as well as the solution viscosity, were measured, giving the results as shown in Table 3.

Example 6

To a 500 cc.-content stainless steel autoclave was placed 250 cc. of xylene. There were added 0.0035 mol. of tri-2-methylpentylaluminum and 0.0025 mol. of titanium trichloride under a dried nitrogen stream which was substantially free from oxygen, and further added 0.0005 mol. of anhydrous antimony trifluoride. The autoclave was closed, cooled to −80° C., evacuated, and fed with 20 g. of highly pure propylene which was condensed in the autoclave. After raising the temperature to 80° C., the autoclave was shaken for 2 hours. The polymerization proceeded rapidly, and the polymerization pressure of initial 10 atm. completely descended after about 3 hours.

The resulting polymeric product was treated with 500 cc. of methanol to decompose the catalyst, boiled with 30% methanolic hydrogen chloride, washed with water, and dried to yield 37 g. of white powdered polymer. The boiling n-heptane-insoluble part of the resulting polymer was 88.2%, and the intrinsic viscosity in Tetralin at 135° C. was 2.82.

Example 7

To 3 l. of purified n-hexane were added 0.05 mol. of titanium trichloride, 0.03 mol. of triethylaluminum, and 0.001 mol. of antimony trichloride, and the mixture was stirred at 60° C. for 3 hours. All of the materials were poured into a polymerization apparatus equipped with a revolving stirrer, and further added with 12 l. of purified n-hexane containing 0.27 mol. of triethylaluminum dissolved. Thereafter, propylene was pressed in, and the polymerization is conducted for 7 hours with stirring, keeping the temperature at 60° C. and the gauge pressure at 3 atm. Methanol was added to the reaction mixture to decompose the residual catalyst, and the polymer was filtered, washed with methanol, and dried to yield 2.2 kg. of a white solid polymer.

The resulting polymer was white fine granules giving a smooth feeling, which had 88.5% of the boiling n-heptane-insoluble part. The intrinsic viscosity in Tetraline solution at 135° C. was 4.0.

Example 8

To a 25 liter-inner content polymerization vessel equipped with a stirrer were added 15 l. of purified n-hexane, 0.052 mol. of titanium trichloride, 0.035 mol. of triethylaluminum, and 0.00052 mol. of antimony trichloride, with no preliminary catalyst preparation process. After closing the autoclave and heating at 60° C., pure propylene was pressed therein and kept at the gauge pressure of 3 atm. for 4 hours under stirring for polymerization. The amount of the antimony trichloride corresponds to 0.01 mol. per mol. of titanium trichloride. After termination of the polymerization, methanol was added thereto and heated under a pressure. The solid product was filtered, washed, and dried to yield 2.17 kg. of white polymeric material. This result shows the polymerization velocity of 28 grams of polymer/gram of $TiCl_3$·hour. The n-heptane-insoluble part in the resulting polymer was 78.6%, $\eta sp/c$ was 2.98, and the residual catalyst in the polymer was 0.04%.

Example 9

To a 25 liter-content polymerization vessel were added 1.5 l. of purified n-hexane, 0.052 mol. of titanium trichloride, 0.035 mol. of triethylaluminum, and an amount of antimony trichloride as described in Table 2 of the text. The mixture was allowed to react at 60° C. with stirring, and, thereafter, added with additional 0.27 mol. of triethylaluminum and 13.5 l. of n-hexane. Purified propylene was fed therein with stirring, and the gauge pressure was kept at 3 atm. at 60° C. to make the polymerization proceed. After termination of the pressure, propylene was removed from the reaction mixture, and, then, methanol was pressed in. The polymeric material was separated by filtration, transferred to a vessel equipped with a stirrer, added with methanol, heated at 80° C. under a pressure with stirring, separated from the liquor, washed, and dried, to yield a white polymer.

The reaction velocities and analytical values of the polymers were set forth in Table 2 of the text as Example 9–(a), (b), (c) and (d).

Example 10

To a 25 liter-inner content polymerization vessel equipped with a stirrer were added 2 l. of purified hexane, 5.0 g. of titanium trichloride, 4.0 g. of triethylaluminum, and 0.3 g. of antimony trichloride. The mixture was stirred at ordinary temperature for 30 min., and, thereafter, added with additional 16 g. of triethylaluminum dissolved in 16 l. of purified hexane. Propylene was fed therein at 60° C. and at the substantially constant gauge pressure of 3 atm. for 8 hours, to make the polymerization proceed. The reaction product was repeatedly washed with methanol to leave 2.3 kg. of a white polymer. The n-heptane-insoluble part in the polymer was 87.8%, and the intrinsic viscosity was 3.82.

Another polymerization process was carried out, in which a mixture of 0.032 mol. of titanium trichloride, 0.035 mol. of triethylaluminum, and 0.0013 mol. of antimony trichloride in 2 l. of purified n-hexane was stirred for 30 min. at 100° C., and, thereafter, additional 0.14 mol. of triethylaluminum in 16 l. of purified n-hexane was added. The resulting white polymer weighed 2.5 kg. The n-heptane-insoluble part in the polymer was 88.7%, and the intrinsic viscosity was 3.91.

Example 11

The same procedure as set forth in Example 8 was repeated to polymerize propylene, excepting that no antimony trichloride was used, though the same amounts of titanium trichloride and triethylaluminum as in Example 8 were used. The yield of a white polymer was 2.36 g. But, the reaction velocity corresponded to 30 grams of polymer/gram of $TiCl_3$·hour, and the n-heptane-insoluble part was 75.8%.

Example 12

The same procedure as set forth in Example 4 was repeated to polymerize propylene, excepting that a binary catalyst system containing the same amounts of titanium trichloride and triethylaluminum as in Example 4 with no antimony trichloride was employed. The results were shown in Table 3. The polymerization velocity was lower, and the n-heptane-isoluble part was 78.6%. The intrinsic viscosity in Tetralin solution at 135° C. was 2.98.

We claim:

1. A method for producing polypropylene highly rich in the isotactic structure, which comprises polymerizing propylene in the presence of a catalyst consisting of titanium trichloride, a trialkylaluminum, and an antimony trihalide.

2. A method for producing polypropylene highly rich is the isotactic structure, which comprises polymerizing propylene in the presence of a catalyst prepared by reacting titanium trichloride, triethylaluminum, and antimony trichloride, in a proportion of 1 to 8 mol. of triethylalminum and 0.001 to 2 mol. per mol. of titanium trichloride, in a polymerization medium.

3. A method of producing polypropylene highly rich in the isotactic structure, which comprises preparing a catalyst component in an inert hydrocarbon medium by reacting titanium trichloride in a concentration of 0.2 to 100 mM./liter, triethylaluminum in a concentration of 1 to 500 mM./liter, and antimony trichloride in a concentration of 0.03 to 100 mM./liter, in a proportion of 3 to 8 mol. of triethylaluminum, 0.001 to 0.05 mol. of antimony trichloride per mol. of titanium trichloride, and adding propylene to said medium for polymerization to produce polypropylene.

4. A method according to claim 3, wherein said reacting of titanium trichloride, triethylaluminum, and antimony trichloride is effected by reacting the mixture at a temperature of between −20° C. to 100° C.

5. A method according to the claim 3, wherein said inert hydrocarbon medium employed in the preparation of the catalyst is selected from the group consisting of n-heptane, n-hexane, benzene, toluene, and xylene.

6. A method according to the claim 2, wherein said polymerization medium is selected from the group consisting of n-heptane, n-hexane, benzene, toluene, and xylene.

7. The method of producing polypropylene rich in isotactic structure which comprises polymerizing propylene in the presence of catalyst prepared by the reaction of (a) titanium trichloride with (b) a trialkylaluminum of which the alkyl group includes up to 6 carbon atoms and (c) an antimony trihalide, in an inert hydrocarbon medium in an amount of 1 to 8 mol. of trialkylaluminum and 0.001 to 2 mol. of antimony trihalide per mol. of titanium trichloride.

8. The method of producing polypropylene rich in isotactic structure which comprises polymerizing propylene in the presence of a catalyst prepared by reaction of (a) titanium trichloride with (b) a trialkyl aluminum selected from the group consisting of triethylaluminum, tripropylaluminum, tributylaluminum or tri-2-methyl pentylaluminum, and (c) an antimony trihalide in an inert hydrocarbon medium in an amount of 1 to 8 mol. of trialkylaluminum and 0.001 to 2 mol. of antimony trihalide per mol. of titanium trichloride.

9. A method as claimed in claim 3 comprising adding to said hydrocarbon medium a polymerization medium containing a trialkylaluminum dissolved therein.

References Cited by the Examiner

UNITED STATES PATENTS

| | | | |
|---|---|---|---|
| 2,910,461 | 10/59 | Nowlin et al. | 260—94.9 |
| 2,935,495 | 5/60 | Kennedy | 260—88.2 |
| 2,945,017 | 7/60 | D'Alelio | 260—94.9 |
| 3,042,626 | 7/62 | Bruce et al. | 260—93.7 |

FOREIGN PATENTS 211,963  12/57  Australia.

JOSEPH L. SCHOFER, *Primary Examiner.*

MARK LIEBMAN, *Examiner.*